(12) United States Patent
Lai

(10) Patent No.: US 9,141,705 B2
(45) Date of Patent: Sep. 22, 2015

(54) METHOD AND SYSTEM FOR SEARCH STRING ENTRY AND REFINEMENT ON A MOBILE DEVICE

(75) Inventor: Jenny Lai, Seattle, WA (US)

(73) Assignee: Nuance Communications, Inc., Burlington, MA (US)

(*) Notice: Subject to any disclaimer, the term of this patent is extended or adjusted under 35 U.S.C. 154(b) by 115 days.

(21) Appl. No.: 12/816,373

(22) Filed: Jun. 15, 2010

(65) Prior Publication Data

US 2010/0318551 A1 Dec. 16, 2010

Related U.S. Application Data

(60) Provisional application No. 61/187,229, filed on Jun. 15, 2009.

(51) Int. Cl.
*G06F 17/30* (2006.01)
(52) U.S. Cl.
CPC .... *G06F 17/30867* (2013.01); *G06F 17/30699* (2013.01)

(58) Field of Classification Search
USPC .......... 707/607, 609, 687, 706, 790, 813, 821
See application file for complete search history.

(56) References Cited

U.S. PATENT DOCUMENTS

| 2007/0100652 A1* | 5/2007 | Ramer et al. ...................... 705/1 |
| 2010/0125562 A1* | 5/2010 | Nair et al. ...................... 707/709 |
| 2012/0216139 A1* | 8/2012 | Ording et al. ................. 715/773 |

* cited by examiner

*Primary Examiner* — Sana Al Hashemi
(74) *Attorney, Agent, or Firm* — Perkins Coie LLP

(57) ABSTRACT

A hardware and/or software facility facilitates search string entry and refinement on a mobile device. A user enters a search string on a mobile device via one or more input methods. The facility searches the user's device and/or one or more remote data areas and returns search results that match the entered search string. Search results include, for example, information, links, files, and other results that correspond to the search string. Before and/or after the search is performed, the facility applies one or more filters that produce refined search results. Filters may relate to location, category, synonyms, data type, social-network, and other groupings—including user-defined groupings—that may refine the search results. Filters may be applied automatically and/or in response to user selection of a filter.

26 Claims, 7 Drawing Sheets

METHOD AND SYSTEM FOR SEARCH STRING ENTRY AND REFINEMENT ON A MOBILE DEVICE

CROSS-REFERENCE TO RELATED APPLICATION(S)

This application claims the benefit of U.S. Provisional Application No. 61/187,229, entitled "METHOD AND SYSTEM FOR SEARCH STRING ENTRY AND REFINEMENT ON A MOBILE DEVICE," filed on Jun. 15, 2009, which is incorporated herein by reference in its entirety.

BACKGROUND

As mobile devices continue to become more prevalent, and as the amount of information that may be accessed by mobile devices increases, it can be challenging for mobile device users to locate relevant information quickly. Searching for information on a mobile device is different than searching for information on a traditional computer system in several ways. First, a mobile device display screen is considerably smaller than a traditional computer monitor, which limits the screen space that is available for a search interface and the display of search results. Second, mobile devices are subject to a greater time lag during a search than a personal computer. A search string is sent from the mobile device to a remote server, processed, and search results returned to the mobile device. Third, the search results that will be most relevant for a user of a mobile device may differ from those that are most relevant for a user of a personal computer. A mobile device user is typically looking for information that relates to something the user is doing at the moment, such as searching for information about a particular location or answering a specific question. Mobile device users are not typically performing extensive research, accessing large or numerous files, or other activities for which a traditional computer is usually used. Finally, communication by voice is much more common on a mobile device than on a personal computer.

A search interface that allows mobile device users to locate relevant information in a timely manner, while taking advantage of the unique mobile device environment, is therefore desired.

DESCRIPTION OF TECHNOLOGY

A hardware and/or software facility for facilitating search string entry and refinement on a mobile device is described. The facility permits a user to enter a search string on a mobile device via one or more input methods. User input methods include, for example, voice commands, keypad selections, handwriting, swipe, scroll, and/or other input mechanisms. The facility searches the user's device and/or one or more remote data areas and returns search results that match the entered search string. Search results may include information, links, files, and other results that correspond to the search string.

The facility applies one or more filters to the search results to produce refined search results that improve the relevancy of the search results, the speed at which results are delivered to the user, and/or to achieve other benefits. Filters may relate to location, category, synonyms, data type, social-network, and other groupings—including user-defined groupings—that may refine the search results. Filters may be applied before and/or after search results are generated. For example, the facility may initially apply a pre-search filter related to a location of the user to deliver location-specific results to the user. Alternatively or additionally, once the search results have been displayed to the user, the user may select one or more filters to further refine the displayed search results.

Figure 1:
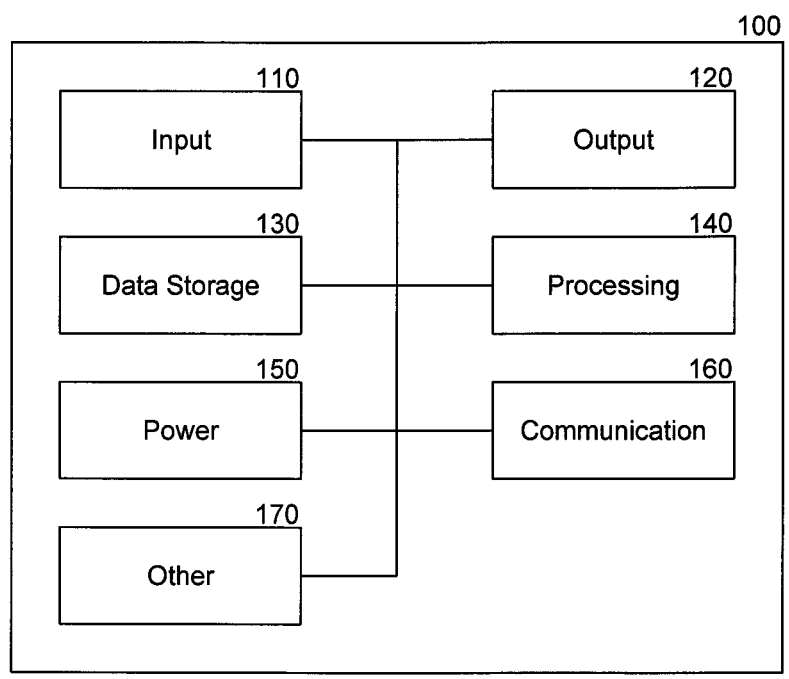
FIG. 1 is a block diagram of a mobile device in which aspects of the described technology may operate.

FIG. 1 is a block diagram illustrating representative components of a mobile device 100. Mobile device 100 may include an input component 110 and an output component 120. Input component 110 receives user input from one or more input controls, such as buttons, scroll wheels, touchpads, microphones, and so on. Output component 120 provides output to a user, including search results and refined search results, and may include an audio playback module, a display module, and so on. Mobile device 100 also includes a data storage component 130. Data storage component 130 may be a magnetic media drive, optical media drive, other non-volatile memory, flash memory, and so on, capable of storing operational software and audio media, video media, image media, and other media types for playback via output component 120. The mobile device may also include a processing component 140 for implementing various software processes, such as searching, filtering, and other data manipulation on the mobile device, a power component 150 that supplies power to the device and the components of the device, and a communication component 160 that communicates with other devices and networks, such as via a wireless network. Examples of communication include wired communication, such as over a USB or firewire connection, wireless communication via licensed or unlicensed spectrum, such as via 802.11 based networks, cellular networks, and so on. Mobile device 100 may also include other components 170, such as components for establishing mobile phone connections, not specifically described herein. Mobile device 100 may include mobile handsets capable of communicating using various wireless standards, mobile computers or devices, Personal Digital Assistants ("PDAs"), handheld computers, wearable computers, tablet computers, pagers, integrated devices combining one or more of the preceding devices, and/or the like.

Figure 2:
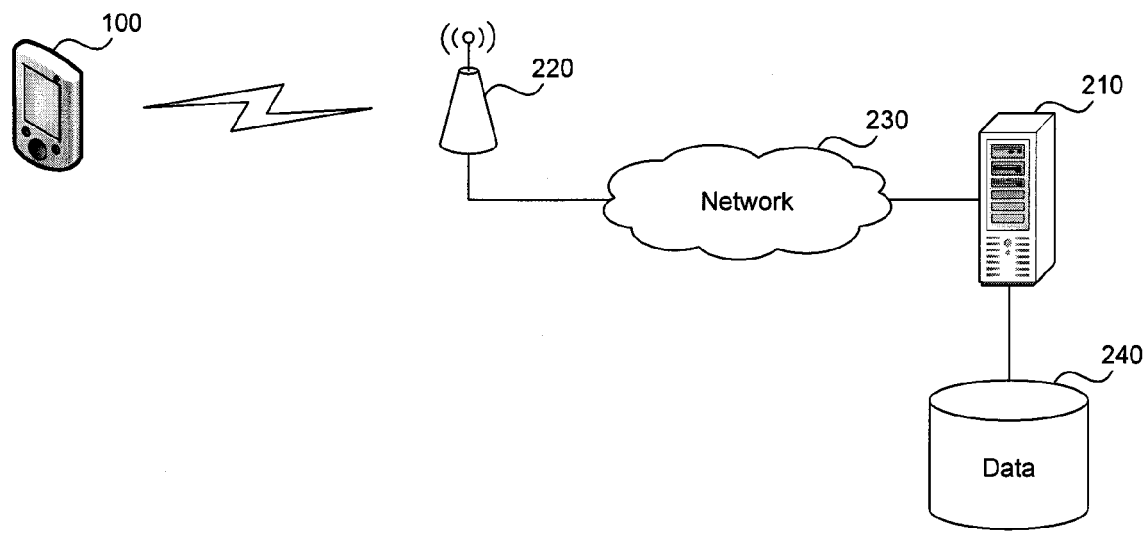
FIG. 2 is a block diagram of a representative system in which aspects of the described technology may operate.

FIG. 2 depicts a representative environment 200 in which the facility operates. A mobile device 100 interacts with a remote computing system, such as server 210, that performs searches and returns search results to the mobile device 100. The mobile device 100 may communicate with the server 210 over a network 230 via wireless access point 220. The facility transmits a search string from the mobile device 100 to the server 210 for processing. The server 210 uses the received search string to perform a search of one or more data areas 240 that are coupled to the server or otherwise accessible by the server, such as via the network 230. The server 210 retrieves matching search results from one or more of the data areas 240 and returns these search results to the mobile device 100, such as over the network 230. In some embodiments, the server 210 returns to the mobile device 100 an identifier associated with each of the one or more search results. A user of the mobile device 100 may select a displayed identifier to view additional details about the search result associated with the selected identifier.

To initiate a search on a mobile device, a user may enter a search string on the mobile device via one or more input methods, such as via voice, keypad, stylus, trackball, touchscreen, or other input method. A search string comprises one or more alphanumeric characters. In some embodiments a user may enter a search string using multiple input methods. For example, the user may enter a first portion of a search string (e.g., one or more alphanumeric characters or words) using voice commands and a second portion of a search string using a keypad. The facility may transmit the entered search string to the server, or the search string may be modified on the user's mobile device before it is transmitted to the server. For example, mobile device software may automatically complete the search terms entered by the user, allowing the user to enter search terms with fewer keystrokes or other manual selections, and/or the mobile device software may automatically correct errors made by the user. In some embodiments, the facility interprets the search string to include an "AND" operator between each term of the search string, indicating that search results are to match all of the terms included in the search string.

As described above, the facility may search the user's mobile device and/or one or more remote data areas for results that match a search string entered by the user. Search results may include information, links, files, and other results that correspond to the entered search string. In those embodiments in which the facility searches the user's mobile device, the facility receives commands, files (e.g., music files, documents, etc.), applications, contact information, calendar information, help information, and other responsive data that is resident on the mobile device. In those embodiments in which the facility searches one or more remote data areas, the facility transmits the entered search string from the mobile device to a server for processing, as described above in reference to FIG. 2. The server retrieves search results that match the entered search string from one or more databases that are coupled to or otherwise accessible by the server, such as via a network. The server may generate a limited number of search results, such as N search results, to be returned to the mobile device and displayed to the user.

Figure 3A:
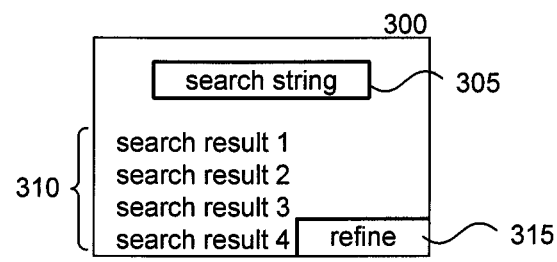
FIGS. 3A and 3B are display diagrams of a user interface for displaying and refining search results.
Figure 3B:
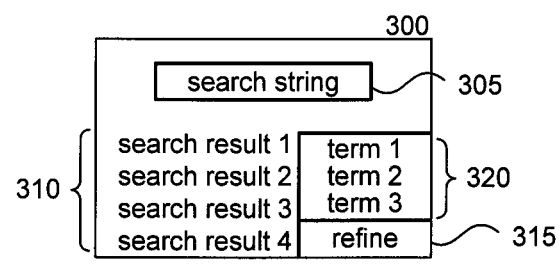

A variety of user interfaces may be used by the facility to display search results on the user's mobile device. FIGS. 3A and 3B illustrate a user interface that may be used by the facility to display search results in some embodiments. FIG. 3A depicts a mobile device display screen 300 with a search string field 305 and a search results area 310. The search string field 305 displays the search string entered by the user of the mobile device. The search results area 310 displays, across an axis of the user interface, all or a portion of N search results retrieved from the mobile device and/or one or more remote data areas. For example, the search results area 310 may display, along a vertical axis, the four most popular search results, and the user may vertically scroll (such as by swiping or movement of a scroll bar (not depicted in FIG. 3A)) to access additional search results. One skilled in the art will appreciate that if no search results were returned, an appropriate textual, audio, or other alert may be provided to the user. For example, the facility may display a message, such as "no matching search results," or otherwise notify the user that no matching search results were found. FIG. 3A also depicts a "refine" button 315, which may be used by the user to generate refined search results by filtering the displayed search results. In some embodiments, the button 315 may be replaced by an icon or other graphic indicating a filtering option to the user. The user may select the "refine" button 315 in a variety of ways, such as by clicking on or tapping the button, selecting a corresponding button on a keypad, saying "refine" into a device microphone, or in another manner.

FIG. 3B depicts a display screen 300 in which the "refine" button 315 has been selected by a user. In response to the selection of the "refine" button, the facility displays, across an axis of the user interface, one or more filters that may be selected by the user to refine the displayed search results. Filters may relate to location, category, synonyms, and other groupings that may limit, focus, redirect, or refine the search results. In some embodiments, upon selection of the "refine" button, the facility may display a list 320 of filter terms. The list 320 of terms may include one or more of the following types of filters:

Category Filters—Category filters are categories that may be selected by the user to refine the user's search. For example, if the user entered the term "restaurant" as all or part of a search string, the facility may display terms including "location," "price," "cuisine," "ratings," and other terms that partition restaurant search results into different categories. The user may select a displayed term to filter the search accordingly and view only restaurants that fall within the selected category.

Data-type Filters—Data-type filters are filters that partition the search results based on the type of application that may use the result. For example, the displayed terms may include such data-types as "contacts," "songs," "pictures," "calendar," and other data used by applications on a mobile device from which search results are desired.

Location Filters—Location filters are absolute or relative geographic locations, such as those locations that are within the vicinity of the user and/or at a desired location. For example, if the user is located in Seattle, the facility may display nearby cities, including Seattle, such as "Seattle," "Shoreline," and "Bellevue," or Seattle neighborhoods, such as "Downtown," "Capitol Hill," and "Queen Anne." Alternatively or additionally, the facility may display various radiuses around the current location of the user (e.g., within 5 blocks, within 10 miles). The user may select one of the displayed cities, neighborhoods, radiuses, or other terms in order to receive more relevant search results. Selecting a location filter may result in the expansion or redirection of the scope of the search. For example, the user may indicate that he wishes to search for results in New York instead of in Seattle. The user may expand or redirect a search in a number of ways, including by selecting an "Expand search" or "Change search radius" term displayed in the list 320 of terms.

Synonym Filters—Synonym filters provide synonyms or similar word choices that are associated with the user's search string. For example, if the user entered the term "restaurant" as all or part of a search string, the facility may display terms that include "dining," "food," and other similar terms. Synonym filters provide search guidance to users that are having difficulty locating a desired search result using a particular search strategy.

Social-network Filters—Social-network filters are filters that partition the search results based on data derived from one or more online social-networking services. For example, if the user entered the term "restaurant" as all or part of a search string, the facility may allow the user to filter the search results to see only those restaurants that have been recommended, rated, or recently visited by a friend or colleague of the user (as identified from social networking services such as FACEBOOK, LINKEDIN, MYSPACE, etc.). The user may select one or more displayed friends or group of friends to filter the search accordingly and view only restaurants that have an association with the selected friend or group of friends.

User-defined Filters—User-defined filters refine the search results based on a keyword by itself or in conjunction with any combination of filter (e.g., location, data type, etc.) that has been previously specified by a user. For example, a user may have a particular naming convention for files stored on the mobile device, and may want the ability to easily filter by keywords that are contained in file names and by type of file (e.g., to filter to find files having a name that includes the keyword "expenses" and which are spreadsheets). A user can enter one or more filter settings via the user interface, a microphone, and/or another input mechanism, and store the filter settings for subsequent application to search results.

A filter may be applied to an entire set of search results or to one or more individual search results. In response to a user selection of a filter that is to be applied to an entire set of search results, the facility displays a revised set of search results on the mobile device. For example, if a user selects a filter term from the list 320 of filter terms depicted by FIG. 3B, the facility may display a new set of search results in search results area 310. The revised search results may be determined by filtering the original search results using the selected filter (i.e., without performing an additional search). Alternatively, the facility may re-search the user's mobile device and/or one or more remote data areas using the user's original search string and the selected filter.

Alternatively, a filter may be applied to one or more individual search results. For example, a user may vertically scroll to or otherwise select "search result 2" in FIG. 3B, and then select a term from the list 320 of filter terms. In response, the facility may display a new "search result 2," without changing the other search results displayed in search results area 310. The revised search result may be displayed by filtering the selected search result using the selected filter (i.e., without performing an additional search), or the facility may re-search the user's mobile device and/or one or more remote data areas using the selected search result and the selected filter. One skilled in the art will appreciate, however, that even if a user has selected a particular search result before the user selects a filter, the facility may apply the selected filter to the entire set of search results, rather than just the selected search result. In addition, a user may select more than one search result from a set of search results, such as by selecting a "control," "shift," or other device button, key, or option. In response to such a selection, the facility may apply a selected filter to just the selected search results or to the entire set of search results.

Figure 4A:
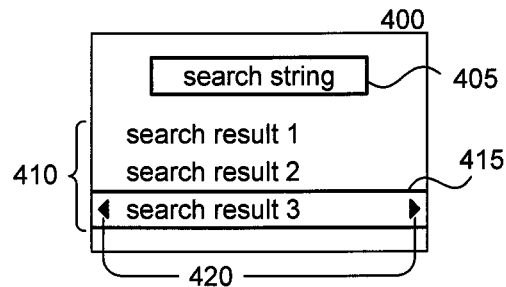
FIGS. 4A-C are display diagrams of an alternative user interface for displaying and refining search results.
Figure 4B:
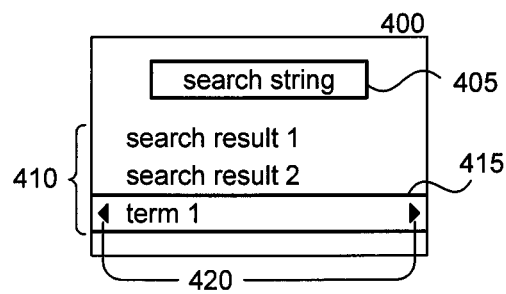
Figure 4C:
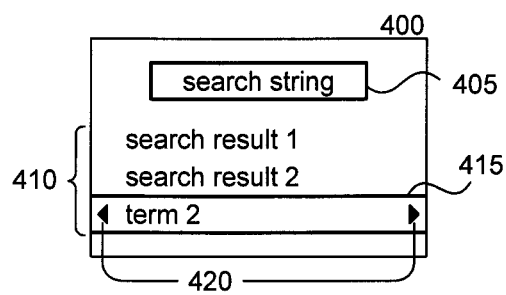

FIGS. 4A-C illustrate an alternative user interface that may be used by the facility to display search results in some embodiments. FIG. 4A depicts a mobile device display screen 400 that includes a search string field 405 and a search results area 410. As described above in reference to FIG. 3A, the search string field 405 displays the search string entered by the user, and the search results area 410 may display all or a portion of the N search results retrieved from the mobile device and/or one or more remote data areas. The user may select a search result from the search results area 410, such as by sliding a selection indicator 415 along a vertical axis over the list of search results. A selection indicator may be a distinguishable box, line, icon, symbol, or other indicator that indicates an active search result to the user. One skilled in the art will appreciate that a selection indicator may be moved by sliding, swiping, scrolling, voice commands, and other means.

As depicted by FIG. 4A, the selection indicator 415 may be associated with arrows 420 and/or other indications that allow the user to scroll along a horizontal axis to filter the selected search result. For example, if a user entered a search string of "Washington mountains," the search results area may include "Mt. Rainier" as search result 3. By sliding the selection indicator 415 vertically to search result 3 and then scrolling horizontally, the user may further refine the selected individual search result 3. For example, scrolling horizontally once may display term 1 as depicted by FIG. 4B, scrolling horizontally again may display term 2, and so on. If the selected search result is "Mt. Rainier," the displayed terms may include "forecast," "directions," and other terms. Displayed terms may also include terms that are similar to those described above in reference to FIGS. 3A-B. For example, if a user entered a search string of "Seattle restaurants," search result 3 in FIG. 4A may be "Italian Restaurant Reviews." By scrolling vertically to "Italian Restaurant Reviews" and then scrolling horizontally, the user may receive filter terms such as "Downtown," "Capitol Hill," "Queen Anne," and other locations by which the user may refine the selected search result, "Italian Restaurant Reviews."

Figure 5A:
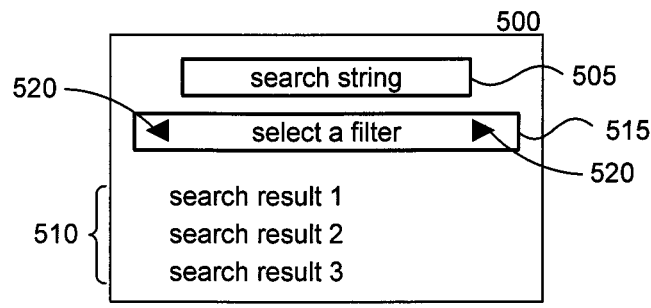
FIGS. 5A-D are display diagrams of another alternative user interface for displaying and refining search results.

FIGS. 5A-D illustrate another user interface that may be used by the facility to display search results in some embodiments. FIG. 5A depicts a mobile device display screen 500 that includes a search string field 505 and a search results area 510. As described above in reference to FIG. 3A, the search string field 505 displays the search string entered by the user, and the search results area 510 may display all or a portion of the N search results retrieved from the mobile device and/or one or more remote data areas. The user may vertically scroll to or otherwise access the displayed search results and/or additional search results. For example, the facility may display a selection indicator, such as that depicted by element 415 of FIGS. 4A-C, that the user may slide vertically over the list of search results to select a search result.

Figure 5B:
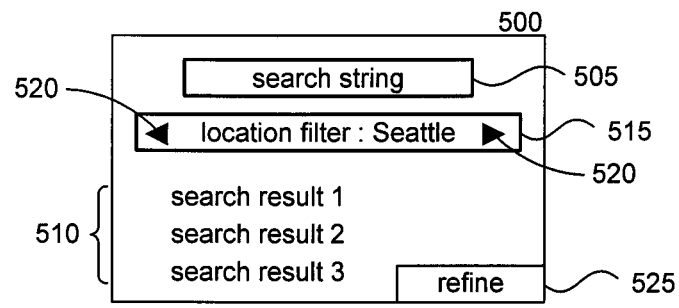

FIG. 5A also depicts a filter selector 515 that allows the user to select one or more filters to refine the displayed search results. The filter selector 515 may be associated with arrows 520 and/or other indications that allow the user to scroll horizontally along an axis to select a filter that is applied to the search string. In some embodiments, the filter selector 515 is initially displayed without a filter selected, as depicted by FIG. 5A. The facility may indicate that no filter is currently selected by displaying text such as "select a filter," "no filter," other text, or no text in the filter selector 515. A user may select a filter by scrolling vertically to the filter selector and then scrolling horizontally, issuing voice commands, and/or in another manner. In other embodiments, the filter selector 515 is initially displayed with a default filter selected. For example, the filter selector may initially be displayed with a location filter selected, as depicted by FIG. 5B. The default filter may be a filter that is predicted to be relevant to the user, the last filter used by the user, or another filter. The user may change the filter by scrolling vertically to the filter selector and then scrolling horizontally to select a new filter, issuing voice commands, and/or in another manner.

Filters available via the filter selector 515 may include category filters, data-type filters, location filters, synonym filters, and other filters. For example, the user may scroll horizontally to select a location filter as depicted in FIG. 5B. In some embodiments, a filter is displayed with a default value that is to be used to filter the search results. A default value may be a value that is predicted to be relevant to the user, the last value used by the user, or another default value. For example, the location filter selected in FIG. 5B is displayed with a default value of Seattle. Seattle may be the current location of the user, the last location searched by the user, a default location entered by the user in a user profile, and/or may otherwise be predicted to be relevant to the user. The user may change the value selected for the filter, such as by selecting the filter selector 515 or a corresponding button and entering a new value, issuing voice commands, and/or in another manner. In other embodiments, a filter is displayed without a default or initial value. The user may enter a value for the filter, such as by selecting the filter selector 515 or a corresponding button and entering a value, issuing voice commands, and/or in another manner.

As described above, a selected filter may be applied to an entire set of search results. For example, if a filter is selected by a user via the filter selector 515, in some embodiments the facility displays a revised set of search results in search results area 510. As described above, the revised set of search results may be determined by filtering the original search results using the selected filter, or the facility may re-search the user's mobile device and/or one or more remote data areas. The revised search results displayed in search results area 510 of FIG. 5B may be different than the search results displayed by FIG. 5A. Alternatively, the search results areas 510 of FIGS. 5A and 5B may contain one or more overlapping search results.

Alternatively, a selected filter may be applied to one or more individual search results. For example, if the user vertically scrolls to or otherwise selects "search result 1" in FIG. 5B, and then selects the Seattle location filter via filter selector 515, the facility may display a new "search result 1," without changing the other search results displayed in search results area 510. The new search result may be determined by filtering the selected search result using the selected filter, or the facility may re-search the user's mobile device and/or one or more remote data areas. One skilled in the art will appreciate, however, that even if a user has selected a particular search result before selecting a filter, the facility may automatically apply the selected filter to the entire set of search results, rather than just the selected search result. In addition, a user may select more than one search result from a set of search results, such as by selecting a "control," "shift," or other device button, key, or option. In response to such a selection, the facility may apply a selected filter to just the selected search results or to the entire set of search results.

Figure 5C:
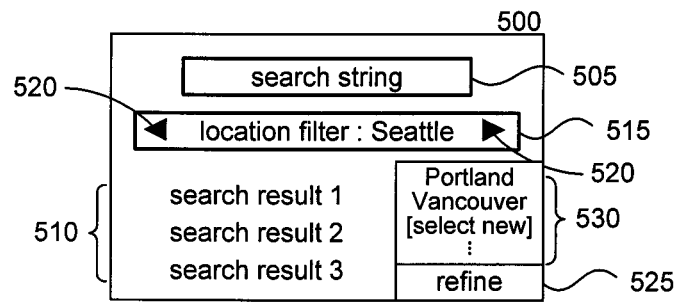

The facility may also display a "refine" button 525 in combination with the filter selector 515. Selection of the refine button in this context allows the user to change the setting of the currently-applied filter. In some embodiments, the facility displays the "refine" button once a filter has been selected, as depicted by FIG. 5B. FIG. 5C depicts a display screen 500 in which the "refine" button 525 has been selected by a user after a location filter (Seattle) has been applied to the search results. Upon selection of the "refine" button, the facility displays a list of different filter terms 530 that are associated with the applied filter. In the depicted example, the facility displays other locations that the user may have previously accessed, have an interest in, may be related to the search query, or otherwise may be beneficial to the user, such as the display of nearby cities "Portland" and "Vancouver" as filter terms 530. The filter terms 530 also include a "[select new]" option, that, when selected by a user, redirects the user to an interface that allows the user to specify a new location. The user may select one of the displayed filter terms 530 to receive a new set of search results, or one or more new individual search results, that are filtered by the selected filter.

Figure 5D:
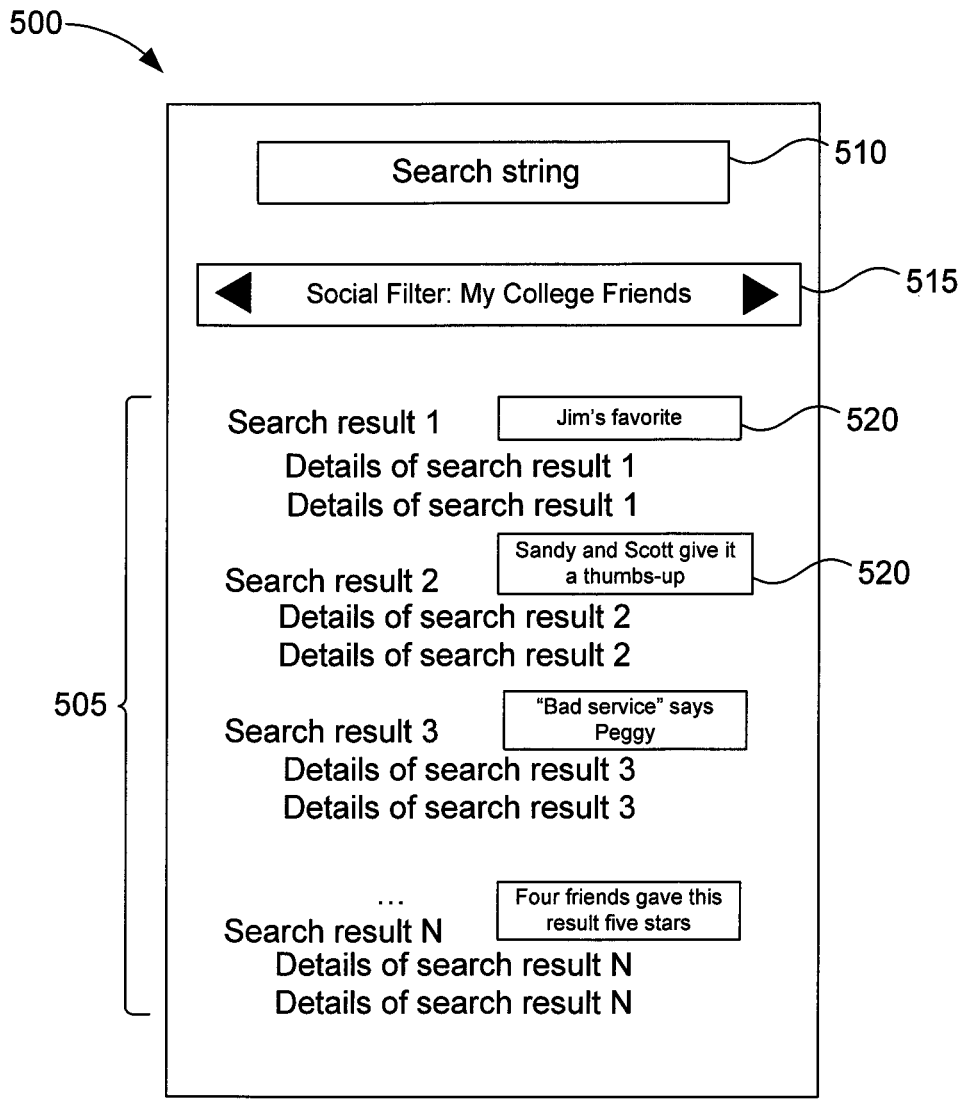

FIG. 5D is a screenshot of a representative user interface 500 that depicts the application of a social-network filter to a set of search results 505. The user has entered a search query into a search string field 510. The facility generates a set of search results 505 that are responsive to the search query, as refined by the filter 515 that has been selected by the user. In the depicted example, the user has selected a social-network filter that limits the search results to those results having an association with a group identified as "My College Friends." As previously described herein, a user can define one or more groups using social networking services like FACEBOOK, LINKEDIN, ORKUT, etc. The facility then filters the search results using information derived from the identified group of individuals. Once filtered, each search result that is displayed may include a badge 520 or other indication of the relevance of the search result to the selected filter. In the depicted example, individual friends of the user have rated various businesses or services that are contained in the search results. The badges 520 therefore identify the particular person that is associated with the search result and indicate the reaction of the person to the business or service that is in the search result. In some embodiments, the user may click-on or otherwise select a badge to be redirected to the rating or other comment that was provided by the identified person. By defining different peer groups and applying each peer group as a different filter, a user is thereby able to quickly peruse reactions to the same search results by different groups of individuals.

It will be appreciated that an interface that allows a user to vertically scroll along a first axis to select a search result, and horizontally scroll along a second axis to refine either a single search result, as depicted by FIGS. 4A-C, or to refine all of the search results, as depicted by FIGS. 5A-D, is a particularly advantageous interface for mobile devices. The vertical and horizontal scrolling maximizes the use of the small display areas that are typically provided in mobile devices. The vertical and horizontal scrolling is also particularly well suited for trackpoints, touchscreens, scroll wheels, or other similar user controls that are increasingly popular on mobile devices. The disclosed facility therefore enables a user to quickly and easily refine search results in order to find a particular result.

Additional user interfaces may also be used by the facility to display search results to the user. For example, the facility may display buttons or other user interface elements that allow the user to specify whether search results are to be retrieved from the device and/or from a network. For example, the user may depress a "phone" button and/or a "web" button on a device display to indicate whether the search is to be conducted locally on the device and/or from remote data areas. Alternatively or additionally, the facility may use graphical elements to display search results to the user, such as displaying a map that is associated with the search results. For example, the facility may display a map that indicates locations associated with the search results, such as restaurants, hotels, or other locations. The user can scroll, expand or contract, or otherwise manipulate the map to refine the search results. As another example, if a user is searching for an event, the facility may display a timeline that the user may slide or otherwise manipulate in order to search for relevant events. One skilled in the art will appreciate that the facility may provide filters in a variety of other ways, including via other textual and graphical means, other visual means, audio means, or in a combination of these and other ways.

Figure 6:
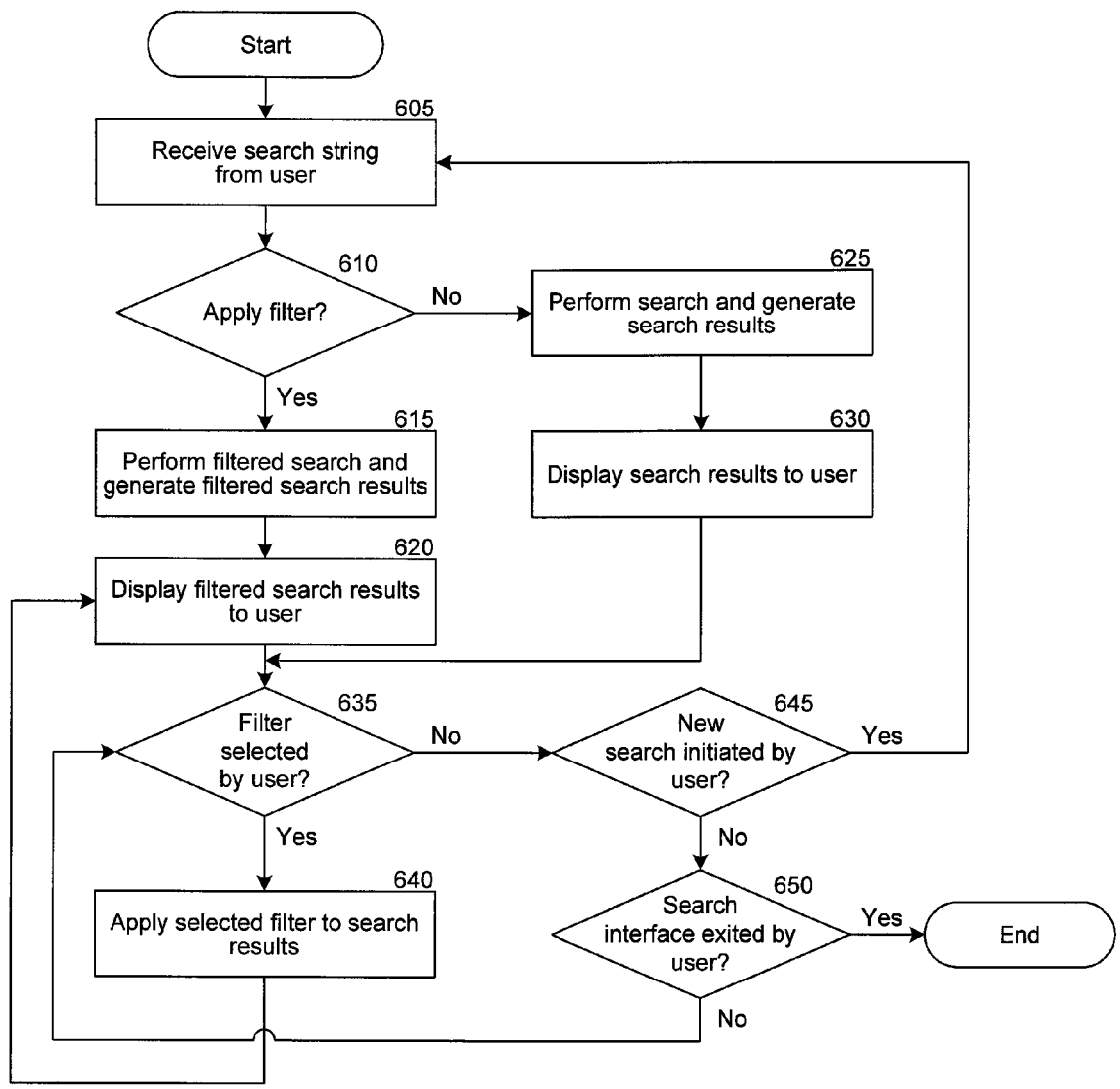
FIG. 6 is a flow diagram of a process for applying a search filter to search results.

The facility may apply one or more filters to construct a search query and perform a search, or may apply one or more filters to the search results after a search is performed. For example, the facility may first apply a location filter, searching for and returning to the user only those results that are within the vicinity of a certain location, such as the user's actual or preferred location. Alternatively or additionally, once search results are displayed to the user, the user may select one or more filters by which to further refine the entire set of displayed search results or one or more selected individual search results, such as described above in reference to FIGS. 3A-B, 4A-C, and 5A-D. FIG. 6 is a flow diagram that illustrates a process used by the facility to apply filters in some embodiments. At a block 605, the facility receives a search string from a user. A search string may be entered by the user via one or more input methods, as described above. At a decision block 610, the facility determines whether a filter is to be applied to a search. If a filter is to be applied, at a block 615, the facility performs the search with the appropriate filter and generates filtered search results. For example, if a user entered "restaurants" as a search string, the facility may apply a filter related to the user's current location, and generate only those results that are within a certain distance of the user's location. A filter may be applied by the facility in a number of ways when performing a search, including by adding one or more additional terms to the entered search string. For example, if a user entered "restaurants" as a search string and the user is in Seattle, the facility may perform a search on the string "restaurants AND Seattle." At a block 620, the facility displays the filtered search results to the user, such as via the user interface depicted by FIG. 3A-B, 4A-C, or 5A-D described above.

If at decision block 610 the facility determines that a filter is not to be applied to the search, at a block 625, the facility performs an unfiltered search, and at a block 630, the facility displays the unfiltered search results to the user. However, the facility may still return a limited number of search results, such as N results, as described above. Whether filtered or unfiltered search results are displayed to the user, once the search results are displayed, the user may select a filter by which to refine the entire set of displayed search results or one or more selected individual search results. A filter may be selected in one or more of the ways described in reference to FIGS. 3A-B, 4A-C, and 5A-D. At a decision block 635, the facility determines whether a filter has been selected by the user. If a filter has been selected, at a block 640 the facility applies the selected filter and returns to block 620 to display the filtered search results to the user. As described above, a filter may be applied by the facility in a number of ways, including by adding one or more additional terms to the entered search string and performing a new search, or by filtering the existing search results.

If at decision block 635 the facility determines that the user has not selected a filter, the facility proceeds to a decision block 645, where the facility determines whether a new search has been initiated by the user. If a new search has been initiated by the user, the facility returns to block 605 to receive a new search string from the user and continue processing. If at decision block 645 the facility determines that a new search has not been initiated by the user, at a decision block 650, the facility determines whether the user has exited the search interface. A user may exit the search interface by navigating or returning to another device display screen, such as a home screen, or in another manner. If the user exits the search interface, the process ends, otherwise the facility returns to block 635 to wait for the user to select a filter. Although not depicted by FIG. 6, the facility may wait a predetermined period of time (e.g., one or more seconds) before returning to block 635 to receive a filter selection from the user.

In some embodiments, the user may save a list of search results and/or details of one or more search results to the user's mobile device. For example, the user may save a list of restaurants or contacts that have been returned as search results; directions to a location, contact details, event details, a recipe; or other search results and/or details of a search result. This functionality allows the user to retrieve the desired information when the user is not connected to a network from which the information can be retrieved, retrieve the information more quickly, and for other benefits. In these and other embodiments, the user may be permitted to send search results and/or details of a search result to another user and/or device.

In some embodiments, the user may assign one or more descriptors to an individual search result or set of search results. The assigned descriptors may subsequently be used by the facility to filter search results. For example, a user may select a song from a set of search results and assign a rating to the song, such as "4 stars" or "8.5." The rating may later be used by the facility to return relevant search results to the user. As another example, a user may select a restaurant listing from a set of search results and assign it a price tag of "$$$$" or "very expensive." This price information may not have been available from the remote site that returned the selected restaurant, or the user's assigned price tag may replace the price information that is maintained on the user's device for the selected restaurant. The user may also assign descriptors to an entire set of search results or to multiple search results. For example, a user may assign a location descriptor, such as "Downtown Los Angeles," to a set of search results or a personal tag, such as "Mexico trip" or "Mom's birthday," to multiple search results.

One skilled in the art will appreciate that the facility described herein may be used in combination with one or more other searching techniques, including multi-stem searching (i.e., performing a search on a search string that has multiple words or word portions), time-based searching (i.e., weighting time periods differently in conducting a search, such as taking greater account of recently performed searches compared to older searches), and other searching techniques. For example, the facility may display a slide or other graphical and/or textual element that allows the user to select how heavily recently performed searches are to be weighted in conducting a new search. One end of the slide may represent weighting recently performed searches more heavily, while the other end may represent weighting recently performed searches less heavily. The user may select a point on the slide that corresponds to the user's preference.

In addition, the facility may be used in combination with ambiguous searching. In some cases, a user may enter a numerical sequence that corresponds to multiple search terms. For example, a user may enter the sequence "4663," which corresponds to both the term "good" and the term "home." In response, the facility may search the user's mobile device and/or one or more remote data areas for search results that match all of the terms corresponding to the entered numerical sequence. The search results may be presented to the user in an integrated manner, or the search results may be presented to the user separated according to each of the matching terms. When the search results are presented to the user in an integrated manner, the user may refine the search results by selecting one or more of the multiple terms. Alternatively or additionally, the user may select one or more of the terms that correspond to the entered numerical sequence before the facility performs its search. In response, the facility may perform a filtered search based on the selected term(s).

From the foregoing, it will be appreciated that specific embodiments of the invention have been described herein for purposes of illustration, but that various modifications may be made without deviating from the spirit and scope of the invention.

I claim:

1. A system for refining search results on a mobile device, the system comprising:
    an input component of the mobile device configured to receive a search query from a user;
    a communication component of the mobile device configured to:
        transmit to a remote computing system the search query; and
        receive from the remote computing system search results based on the search query;
    a display component of the mobile device configured to display, simultaneously;
        received search results; and
        an indication of an applied filter, when a filter is applied to the received search results;
    a touch-sensing component of the mobile device configured to detect swiping gestures of a user;
        wherein a vertical swiping gestures by the user user causes displayed search results to vertically scroll on the display, and
        wherein a horizontal swiping gesture by the user causes a filter from one or more filters to be applied to the received search results; and
    a processing component of the mobile device configured to generate refined search results, wherein in response to detection of a horizontal swiping gesture by the user the refined search results are generated by applying a filter from the one or more filters to the received search results and the refined search results are caused to be displayed in conjunction with an indication of the applied filter.

2. A computer implemented method of refining search results on a mobile device, the method comprising:
    receiving at the mobile device one or more search terms from a user;
    transmitting by the mobile device the one or more search terms to a remote device;
    receiving by the mobile device a search result dataset from the remote device, wherein the search result dataset corresponds to the one or more search terms, and wherein the search result dataset comprises one or more search results;
    displaying via a user interface of the mobile device at least part of the search result dataset;
        wherein a first portion of the one or more search results is displayed along a vertical axis of the user interface, and
        wherein a next portion of the one or more search results is displayed along the vertical axis in response to vertical scrolling by a user,
    displaying, simultaneously with the search results, a filters selection indicator associated with the horizontal axis;
        wherein the filter selection indicator indicates when a filter is applied to the search results;
        wherein a first filter is displayed in response to a first horizontal scrolling by the user, and
        wherein a second filter is displayed in response to a second horizontal scrolling by the user;
    in response to detecting a horizontal scrolling by a user of the search results, applying, by the mobile device, the displayed filter to at least one of the one or more search results to generate filtered search results; and
    displaying the filtered search results along the vertical axis of the user interface.

3. A computer-readable medium having stored thereon computer-executable instructions for refining a search string on a mobile device, wherein the instructions, when executed by a computing system, cause the computing system to:
    display, on a user interface of the mobile device:
        a plurality of search results of a first search result dataset, wherein the first search result dataset is associated with a first search, and wherein the user interface is manipulable along a vertical axis to display additional search results of the first search results dataset; and
        one or more search filters, wherein the search filters are useable to refine the first search result dataset, and wherein the interface is manipulable along a horizontal axis to display other search filters;
        wherein the search results and the search filters are simultaneously displayed and independently selectable; and
    in response to receiving a selection of at least one of the one or more search filters, perform a second search of a data storage component of the mobile device based on;
        the first search or one or more of the plurality of search results of the first search result dataset, and
        the selected search filter;
        wherein one or more search results of the second search replace one or more search results of the first search result dataset displayed on the user interface.

4. The system of claim 1, wherein the input component is configured to receive input comprising at least one of a voice command, handwriting, a keypad selection, and a swipe.

5. The system of claim 1, wherein the processing component is further configured to perform an additional search on the mobile device based on the search query, and wherein the displayed search results include the search results received from the remote computing system and search results produced by the additional search on the mobile device.

6. The system of claim 1, wherein at least one of the one or more selected filters is automatically selected by the processing component.

7. The system of claim 1, wherein the indication of an applied filter is only displayed after a command is received from the user.

8. The method of claim 2, further comprising:
    modifying by the mobile device the one or more search terms based on a pre-search filter, before transmitting the one or more search terms to the remote computing system.

9. The method of claim 2, further comprising:
    performing by the mobile device a search of a local storage location of the mobile device based on the search terms, and
    wherein the search result dataset includes the one or more search results received from the remote computing system and search results generated by the search of the local storage location.

10. The method of claim 2, wherein the filters include a user-defined filter based on data entered by the user.

11. The method of claim 2, wherein the filters include a social-network filter to partition the search result dataset based on data from one or more social-network networks.

12. The method of claim 2, wherein the filters include a location filter to partition the search result dataset based on a geographical location.

13. The method of claim 2, wherein the filter selection indicator comprises a distinguishable box, line, icon, or symbol.

14. The method of claim 2, wherein vertical scrolling comprises a scrolling or swiping motion performed by the user in a direction substantially parallel to the vertical axis.

15. The method of claim 2, wherein horizontal scrolling of the filter selection indicator comprises a scrolling or swiping motion performed by the user in a direction substantially parallel to the horizontal axis.

16. The method of claim 2, wherein at least one of the filtered search results is displayed in place of a selected one of the displayed search results.

17. The method of claim 2, wherein no search filter is initially applied to the search results.

18. The computer-readable medium of claim 3, wherein the instructions further cause the computing system to:
- display a horizontal indicator on the user interface; and
- in response to receiving a user manipulation of the horizontal indicator, display a next filter.

19. The computer-readable medium of claim 3, wherein the instructions further cause the computing system to:
- display a refinement indicator on the user interface; and
- in response to receiving a selection of the refinement indicator, display on the user interface one or more selectable filter terms associated with a selected filter, wherein receiving a selection of a filter term causes the computing system to modify the first search result dataset based on the selected filter term.

20. The computer-readable medium of claim 3, wherein the one or more search filters include a data-type filter to limit the first search result dataset to one or more search results based on a type of application associated with the plurality of search results.

21. The computer-readable medium of claim 3, wherein the one or more search filters include a relation filter to display one or more search results that provide additional information associated with one or more of the plurality of search results.

22. The computer-readable medium of claim 3, wherein the one or more search filters include a synonym filter to display one or more search results based on a synonym substantially related to a search term of the first search.

23. The computer-readable medium of claim 3, wherein the one or more search filters include a location filter to limit the first search result dataset based on a geographical location of the mobile device.

24. The computer-readable medium of claim 3, wherein manipulation of the user interface to display a search filter selects the displayed search filter, such that the second search is performed based on the displayed search filter.

25. The system of claim 7, wherein the command comprises user selection of a displayed graphic.

26. The system of claim 7, wherein the command comprises a voice command.

* * * * *